US010019424B2

(12) United States Patent
Lopez et al.

(10) Patent No.: US 10,019,424 B2
(45) Date of Patent: Jul. 10, 2018

(54) SYSTEM AND METHOD THAT INTERNALLY CONVERTS POWERPOINT NON-EDITABLE AND MOTIONLESS PRESENTATION MODE SLIDES INTO EDITABLE AND MOBILE PRESENTATION MODE SLIDES (ISLIDES)

(71) Applicant: Universidad de Santiago de Chile, Santiago (CL)

(72) Inventors: Mario J. Lopez, Santiago (CL); Hector R. Ponce, Santiago (CL)

(73) Assignee: Universidad de Santiago de Chile (CL)

( * ) Notice: Subject to any disclaimer, the term of this patent is extended or adjusted under 35 U.S.C. 154(b) by 650 days.

(21) Appl. No.: 14/585,232

(22) Filed: Dec. 30, 2014

(65) Prior Publication Data

US 2016/0188136 A1    Jun. 30, 2016

(51) Int. Cl.
*G06F 3/00* (2006.01)
*G06F 17/24* (2006.01)
*G06F 8/61* (2018.01)

(52) U.S. Cl.
CPC ................ *G06F 17/24* (2013.01); *G06F 8/61* (2013.01)

(58) Field of Classification Search
CPC .................................. G06F 17/24; G06F 8/24
See application file for complete search history.

(56) References Cited

U.S. PATENT DOCUMENTS 5,917,480 A    6/1999 Tafoya
6,836,870 B2  12/2004 Abrams
(Continued)

OTHER PUBLICATIONS

'Flevy Tools 2.0 Released, Our Free PowerPoint Plugin for Business Diagrams', by Flevy on Sep. 17, 2013. Available at: http://flevy.com/blog/flevy-tools-2-0-released-our-free-powerpoint-plugin-for-business-diagrams/.*

(Continued)

*Primary Examiner* — Omar Abdul-Ali
(74) *Attorney, Agent, or Firm* — Tolpin & Partners PC; Thomas W. Tolpin (57) ABSTRACT

The invention is packed into an iSlide-Add-in for PowerPoint (POWERPOINT) software presentation that, on the one hand, overcomes all interactivity flaws reported by the active audience literature and conference speakers' experience; on the other hand, it overcomes dependency from external elements and removes concerns about security and vulnerability. iSlides is a system because it installs the iSlide-Add-in from the executable software iSlidesInstaller.exe 10, 20. The iSlide-Add-in augments the main ribbon options of PowerPoint (POWERPOINT) software presentation with a new I-SLIDE tab 31. This new option allows the insertion of a variety of iSlides (interactive slides), which highest feature is that text in them all are editable in PowerPoint (POWERPOINT) presentation mode. Additionally all type of text objects are editable, resized and mobile in PowerPoint (POWERPOINT) presentation mode 22 and external forms (images, pictures) are resized and mobile. iSlides is a method since a user of PowerPoint (POWERPOINT) software presentation follows simple steps to insert as many interactive slides into the presentation as the presentation interactive events require. There is a typically PowerPoint (POWERPOINT) set of steps to design the iSlide in PowerPoint (POWERPOINT) design mode and there is new set of steps that the presenter has to follow to edit, resize and move text objects and resize and move external objects in PowerPoint (POWERPOINT) presentation mode.

14 Claims, 10 Drawing Sheets

(56) References Cited

U.S. PATENT DOCUMENTS

| | | | |
|---|---|---|---|
| 2003/0034999 A1* | 2/2003 | Coughlin, III | G09B 7/00 |
| | | | 715/738 |
| 2005/0060283 A1* | 3/2005 | Petras | G06F 17/30864 |
| 2005/0091506 A1* | 4/2005 | Miller | G06Q 20/40 |
| | | | 713/182 |
| 2015/0033102 A1* | 1/2015 | Losvik | G06F 17/21 |
| | | | 715/202 |
| 2015/0121189 A1* | 4/2015 | Titterington | G09B 5/00 |
| | | | 715/230 |

OTHER PUBLICATIONS

'SlideDynamic: Review': posted Sep. 29, 2010. Available at: http://www.m62.net/powerpoint-training/presentation-software/slidedynamic-review/.*

Customize the ribbon. Microsoft Office Support page. Retrieved May 27, 2017. Available at: https://support.office.com/en-us/article/Customize-the-ribbon-3c610b47-6f0f-4179-83d3-68a254a80ea6.*

PowerPoint Add-ins. Geetesh Bajaj. Feb. 6, 2003. Available at: http://www.indezine.com/products/powerpoint/addin/.*

\* cited by examiner

SYSTEM AND METHOD THAT INTERNALLY CONVERTS POWERPOINT NON-EDITABLE AND MOTIONLESS PRESENTATION MODE SLIDES INTO EDITABLE AND MOBILE PRESENTATION MODE SLIDES (ISLIDES)

BACKGROUND OF THE INVENTION

1. Field of the Invention

The present invention relates to the world's most popular presentation software—Power Point, namely, Microsoft PowerPoint 2013 (POWERPOINT) presentation program which is a slide-based presentation software (computer) program for use with Microsoft Windows and Apple Macintosh operating systems, as well as Microsoft PowerPoint mobile application for use on Apple and Android mobile operating systems. PowerPoint (POWERPOINT) operates under two modes: edit and slideshow. Text creating and positioning is possible in edit mode only; embedded objects final positioning is also possible in edit mode only. This arise awkward situations whenever a presenter is in presentation mode and wishes or needs to do some editing.

Particularly, the present invention enhances PowerPoint presentation software, namely, POWERPOINT slide-based presentation software program, with a new functionality. The new functionality makes PowerPoint presentation software capable of text editing and object editing and moving in slideshow mode. Thus, the invention overcomes PowerPoint presentation software reported shortcomings.

A very important invention's externality are the benefits generated for audiences, such as presentations content retention improvement, executive meetings effectiveness development, students learning improvement, among many others.

2. State of the Art

Scientific evidence shows that in most presentations the presenter takes an active role and the audience assumes a passive role. This presentation style exhibits a very low effectiveness level compared to other methods where presenter and audience interact (Schrad, 2010). Classical examples relate to business meetings, conference presentations, and educational lectures, where it is difficult for the presenter to integrate participants' feedback into the PowerPoint (POWERPOINT) software presentation. Some problems with this type of presentations are low content retention, ineffectiveness to inspire interest on subject presented, trouble to assist skill development, and distress to motivate audiences (Bligh, 1998).

The evidence also points out that PowerPoint (POWERPOINT) software presentation supported conferences do not increase audience retention compared with conferences that use overhead projectors or Web presentations (Bartsch, 2003), (Savvoy, 2009). A solution the active-presenter passive-audience situation includes converting the audience into an active participant (Prince, 2004). The literature suggests presenters engage audiences through interactive methods, such as problem solving, discussion, role playing exercises, feedback, collaborative meetings, and generating instances of questions and answers at conferences. These methods have demonstrated to be better than those with passive audience, to increase retention levels, improve decision-making, increase idea generation, facilitate critical thinking, among other advantages (Silberman, 1995).

However, the challenge for the presenter is twofold, first to generate instances for such audience participation and second to manage audience's feedback to use it as input for the participation process.

Presentation software, such as PowerPoint (POWERPOINT) presentation program, was developed at a time when active-presenter and passive-audience style was the dominant setting. The software replaced the slide and overhead projectors (Bartsch, 2003).

PowerPoint presentation program, and other presentation software, revolutionized the planning of conference content presentations (Kosslyn, 2012); however, the presenter-audience interaction remained the same as well as the situations described above (Burke, 2009).

Therefore, PowerPoint presentation program, and similar presentation software, do not allow the use of interactive methods in conferences, nor facilitates collaborative meetings implementation. PowerPoint neither allows slide updating in presentation mode so the presenter may collect audience's feedback and incorporate it into the presentation. Microsoft Company periodically releases new versions of its Microsoft Office suit with improved functionalities. The latest Microsoft 2013 and 365 PowerPoint versions did not include presentation mode editing facilities. Other agencies have also attempted to include interactivity in presentation mode.

A search into U.S. Patent and Trademark Office (USPTO) database found 426 documents that include the words 'slideshow' or 'slide show' in its claims; 60 of those documents are assigned to Microsoft.

Documents analyses showed that some documents describe systems and methods associated to slideshow software applications, where modification or editing is feasible in presentation mode; however, the documents found describe the use of external systems, applications or databases; the modification is made in these external elements, and then incorporated into the slide displayed in presentation mode.

The closest documents were U.S. Pat. No. 6,836,870 and U.S. Pat. No. 5,917,480. The first describes the use of a second window to make the changes through a COM server. This document not only reports the use of external elements, but also the use of an ActiveX control, which "may pose security risks because they can contain code intended to attack hosts and servers on a protected network" (Cisco Systems, 2014).

The second document describes the inclusion of a control monitor, seen only by the presenter, with three functionalities: speaker note taking associated to particular slides; minutes taking to record notes during the presentation; and creation of new slides inserted at the presentation end. In brief, it is a tool for the presenter to interact with his/her presentation.

None of the documents found describe characteristics associated with presentation software such as PowerPoint, in which slide modification or editing is done directly within PowerPoint presentation mode and using the same presentation software.

SUMMARY OF THE INVENTION

The invention is packed into an iSlide-Add-in for PowerPoint (POWERPOINT) software presentation program that, on the one hand, overcomes all interactivity flaws reported by the active audience literature and conference speakers' experience; on the other hand, it overcomes dependency from external elements and removes concerns about security and vulnerability.

iSlides is a system because it installs the iSlide-Add-in from the executable software iSlidesInstaller.exe 10, 20. The iSlide-Add-in augments the main ribbon options of for PowerPoint (POWERPOINT) software presentation program with a new I-SLIDE tab 31. This new option allows the insertion of a variety of iSlides (interactive slides), which highest feature is that text, in them all, are editable in PowerPoint presentation mode. Additionally all type of text objects are editable, resized and mobile in PowerPoint presentation mode 22 and external objects, such as images and pictures are resized and mobile.

iSlides is a method since a user of PowerPoint (POWERPOINT) software presentation program follows simple steps to insert as many interactive slides into the presentation as the presentation interactive events require. There is a typically PowerPoint set of steps to design the iSlide in PowerPoint design mode and there is new set of steps that the presenter has to follow to edit text and move and edit objects in PowerPoint presentation mode.

Technically, every time a designed presentation is launched into presentation mode, the invention takes control of the presentation mode, managing both PowerPoint (POWERPOINT) traditional static slides and the new PowerPoint dynamic slides (iSlides). The iSlide-Add-in does nothing if it checks that the slide in presentation mode is a conventional PowerPoint slide, presentation control remains within PowerPoint. If the iSlide-Add-in checks that the presentation the slide in presentation mode is an iSlide, it changes the presentation mode configuration, suppressing all commands available through PowerPoint Shortcut Tools; the 'Esc' key function is the one that remains to allow returning to design mode. Presentation mode control is taken by the iSlide-Add-in through its three layers.

BRIEF DESCRIPTION OF DRAWINGS

In order to facilitate a comprehensive understanding of the iSlide-Add-in invention, the following sections summary of invention and detailed description of the embodiments will make reference to 19 illustrative drawings, which are presented at the end of this document. The drawings illustrate principles of the invention and, although not to scale, show relative dimensions.

DETAILED DESCRIPTION OF A PREFERRED EMBODIMENT

The System

The iSlide system will work in whatever system that support MS Office software, versions 2013 and 365. Such systems are, on the one hand, desktop computers with Windows 7 or later versions operation system or computers with iOS operation system and, on the other hand, mobile devices with Windows 8 operating system or iOS 8 operating system. The iSlide system works independently from the devise configuration, which may vary from stand alone to network installations.

Figure 1:
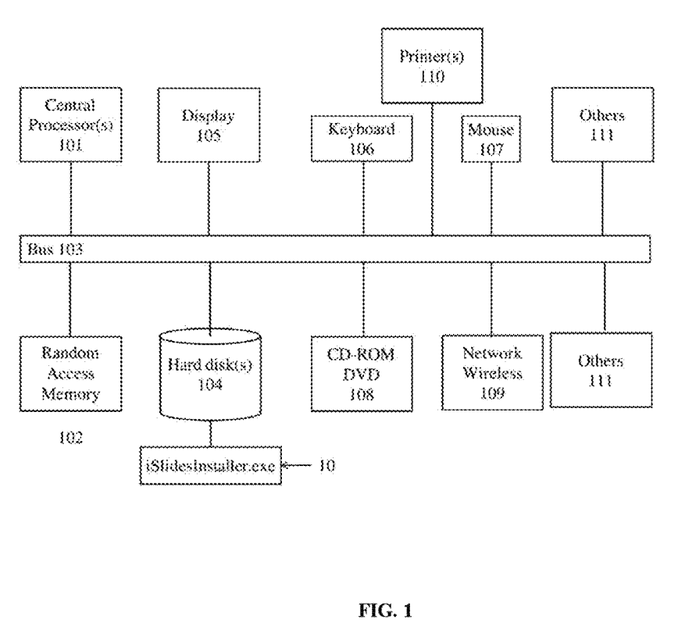
FIG. 1 is a typical desktop, laptop or netbook block diagram depicting the system requirements for the iSlide-Add-in to be installed in MS Office 2013 or MS Office 365.

Error! Reference source not found. is a block diagram representing a desktop, laptop or netbook system in which the invention works. It consist of a central processor 101, a random access memory 102 and an internal bus 103, which connects all computer components. The system also includes hard disk(s) 104, display unit 105, keyboard 106 and mouse 107. Further, the system may likewise comprise CD-ROM/DVD units 108, network connectivity (cable and Wi-Fi) 109, printer(s) 110 and other devices 111. The most relevant element for the invention to work is the downloading, into the hard disk, the iSlide-Add-in software installation executable application: iSlidesInstaller.exe 10.

Figure 2:
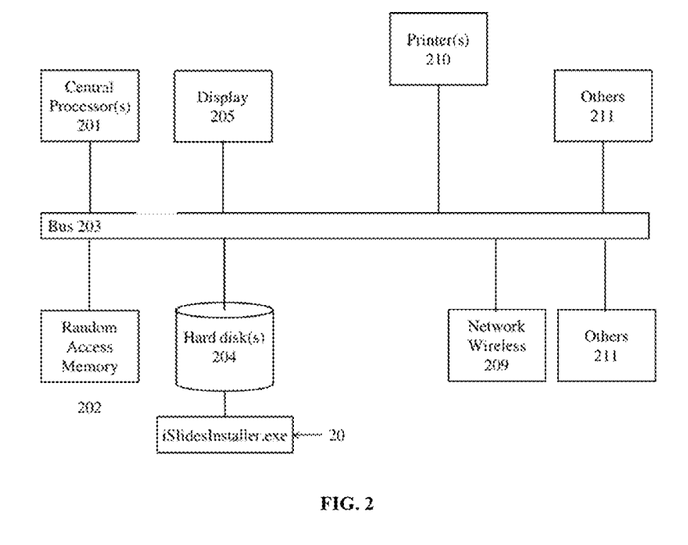
FIG. 2 is a typical mobile device block diagram depicting the system requirements for the iSlide-Add-in to be installed in MS Office 2013 or MS Office 365.

Error! Reference source not found. is a block diagram representing a mobile system (tablet, smartphone) in which the invention works. It consist of a central processor 201, a random access memory 202 and an internal bus 203, which connects all computer components. The system also includes hard disk(s) 204, and a display unit 205. Further, the system may likewise comprise, network connectivity (cable and Wi-Fi) 209, printer(s) 210 and other devices 211. The most relevant element for the invention to work is the downloading, into the hard disk, the iSlide-Add-in software installation executable application: iSlidesInstaller.exe 20.

Figure 3:
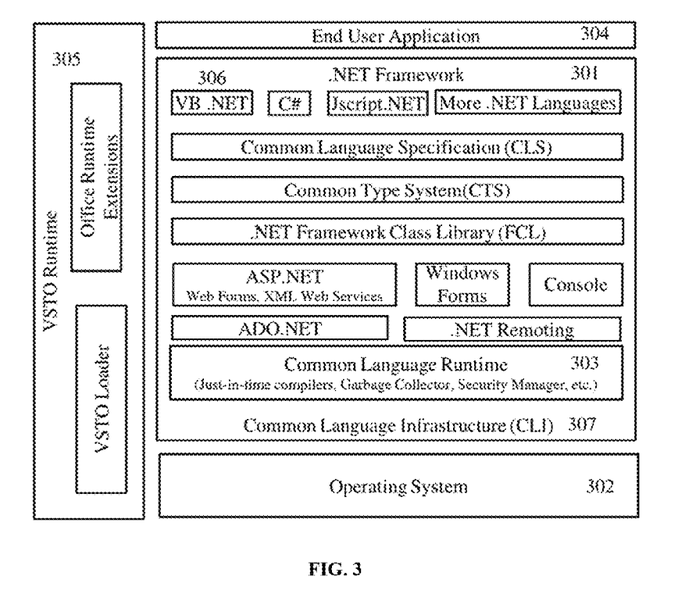
FIG. 3 is the Microsoft .NET framework block diagram. .NET Framework manages de relationship between the operating system and the end user applications.

FIG. 3 shows that the invention, as an end user application, works in a MS Office environment. The invention integrates to PowerPoint (POWERPOINT) software presentation program through the Microsoft Company provided 'application programming interface' (API).

An application programming interface is a software component with functions and procedures to be used by another application or component; it also allows code reuse.

The programming of the iSlide-Add-in uses Visual Studio Tool for Office (VSTO) 305. VSTO is a set of development tools for development environment and a runtime execution environment. It works in Microsoft .NET framework 301.

.NET framework is a software component that may be included into MS operating system 302. The component is a set of predefined solutions for general application programming, execution and management. .NET unifies software applications developed in Visual Basic .NET 306 and C# within a Common Language Runtime 303. The complements are developed in a programming language attuned with the Common Language Infrastructure 307.

Figure 4:
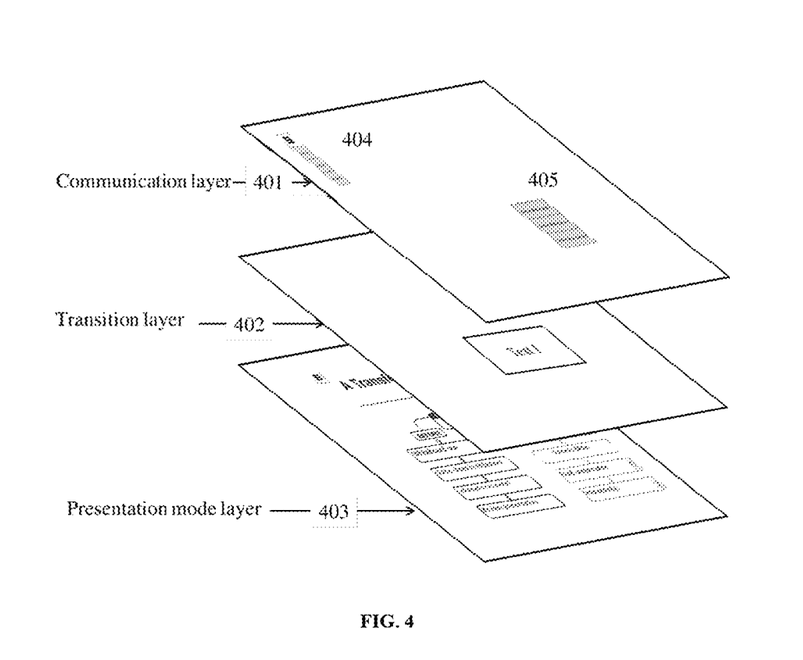
FIG. 4 is the iSlide-Add-in internal layers structure block diagram.

The iSlides-Add-in 304 is an end user software application that complements PowerPoint (POWERPOINT) software presentation, adding functionalities not presently available in PowerPoint (POWERPOINT) software presentation. The iSlide-Add-in, in PowerPoint (POWERPOINT) presentation mode, discriminates whether the slide is static or dynamic. If the slide is static, that is, it is a PowerPoint (POWERPOINT) slide, the iSlide-Add-in does nothing and slide control remains with PowerPoint (POWERPOINT). If the slide is dynamic, that is, it is an iSlide; the iSlide-Add-in suppresses all available PowerPoint (POWERPOINT) commands through PowerPoint (POWERPOINT) Shortcut Tools and takes control. The iSlide-Add-in works the dynamic slides in three layers: communication, transition, and presentation mode, as illustrated in FIG. 4.

The communication layer 401 implements the dialog with the user. If the user is using a desktop, laptop or netbook, such as the ones described in Error! Reference source not found., there are two options for the communications: a tool bar 404 and a mouse activated contextual menu 405. If the user is using a mobile device, such as the one described in Error! Reference source not found., there is one touch option for the communication, the tool bar 404.

The communication layer actives/deactivates/modifies text and object settings in presentation mode running time. It is an upper left tool bar that includes a communication interface in order to transfer data with iSlide-Add-in external components. The communication layer is the iSlide-Add-in core, because it interacts with PowerPoint (POWERPOINT) native communication base. This allows saving permanently changes made to an iSlide in presentation mode. The transition layer 402 is where the dynamic characteristics of iSlides take place in presentation mode. Each presentation mode element format change (form, size, color, and content, among others) are first done within this layer and then passed to the real slideshow presentation. The presentation layer 403 is the same PowerPoint (POWERPOINT) slideshow presentation, with PowerPoint (POWERPOINT) commands suppressed and controlled by the transition layer.

Communication between iSlide-Add-in layers is done through message passing, as user-presentation interaction demands. For example, if the user activates the dynamic mode in the toolbar, this will inform the presentation layer that it should pay attention to any user interaction (with both keyboard and mouse). It then informs the communication layer that it should deliver the interaction information to the transition layer to reflect the result of user's interactions (resizing a form, update content, moving an object from its original location to another, etc.).

Figure 6:
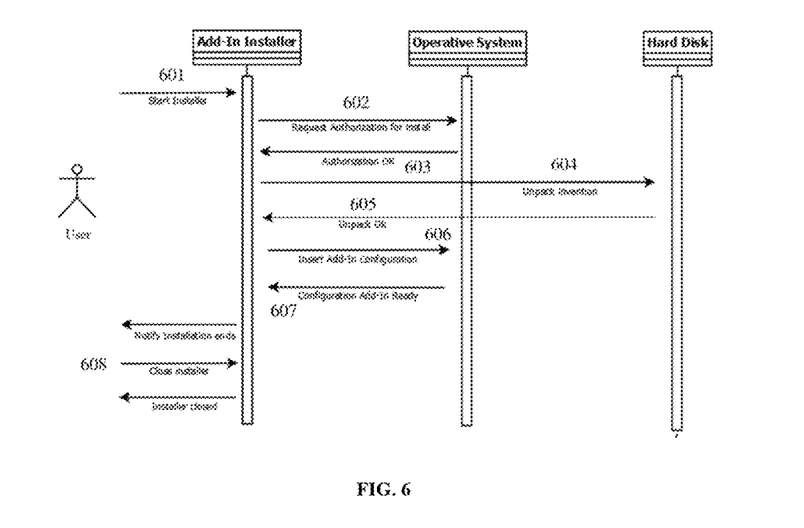
FIG. 6 is an unified modeling language (UML) sequence diagram to install the invention.

FIG. 6 is an UML sequence diagram to install the invention. The user activates iSlidesInstaller.exe to install the invention 601, the installer requests installation authorization to the operating system 602. Once the operating system provides the authorization 603, the installer unpacks the invention into the user computer hard disk 604. After unpacking is successfully completed 605, the installer provides the iSlide-Add-in configuration to the operating system 606 which saves the relevant records 607. The installation finishes with an iSlide-Add-in installer and user notification and acceptance panel 608.

Figure 7:
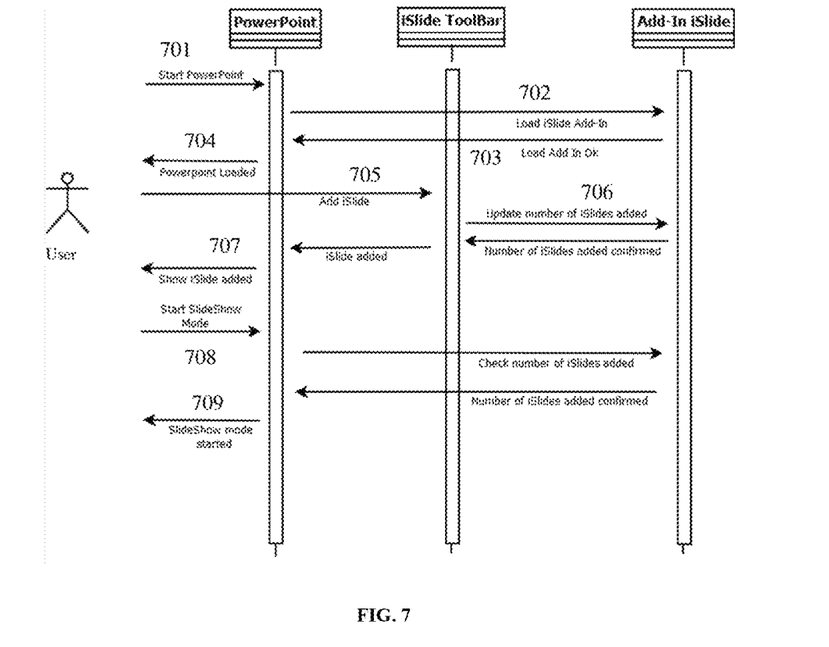
FIG. 7 is an UML sequence diagram to execute the invention.

FIG. 7 is an UML sequence diagram that shows how to execute the invention. The invention execution stage activates when the user starts PowerPoint (POWERPOINT) 701 software presentation, while PowerPoint (POWERPOINT) software presentation is loaded, it verifies available complements (iSlide-Add-in) and loads the iSlides-Add-in 702. Once the iSlide-Add-in is loaded 703 PowerPoint (POWERPOINT) software presentation is initiated 704. The user inserts one iSlide 705 or more iSlides 706 and the user sees the added iSlides 707. The user activates PowerPoint (POWERPOINT) presentation mode 708 and the iSlide-Add-in checks for iSlides presence and starts slideshow 709.

Figure 8:
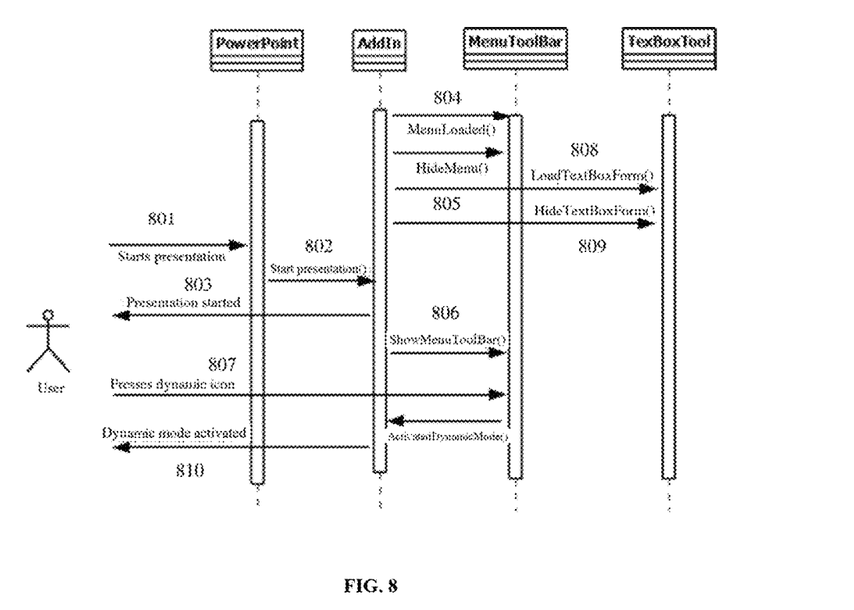
FIG. 8 is an UML sequence diagram revealing a typical interaction between a user and the iSlide system invention.

FIG. 8 is an UML sequence diagram revealing a typical interaction between a user and the iSlide system invention; in this case a text boxes iSlide.

Figure 5:
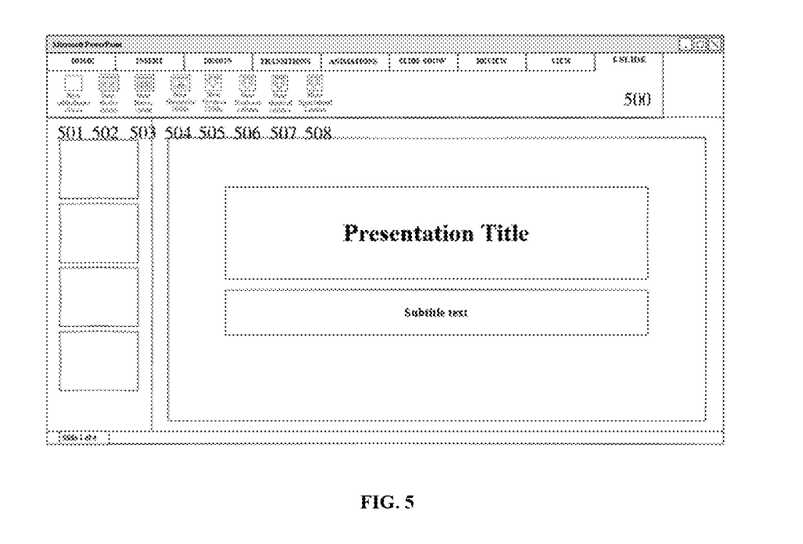
FIG. 5 is a PowerPoint (POWERPOINT) new I-SLIDE functionality block diagram.

Error! Reference source not found. is an archetype for all iSlides types: Whiteboard iSlide 501, Bullet iSlide 502, Matrix iSlide 503, Hierarchy iSlide 504, Textbox iSlide 505; as well as access to numerous group commands: Business iSlides 506, Medical iSlides 507, and more specialized iSlides 508. The system will work under conditions: presentation mode must be active; the presentation must have at least one dynamic slide; and the actual slide must be an iSlide. The user initiates the presentation (pressing F5 or selecting SLIDE SHOW/From Beginning) 801. PowerPoint (POWERPOINT) software presentation starts the presentation 802 and user sees the presentation 803. The invention (iSlide Add-in) loads tool bar and contextual menu 804 and hides the menu until is recall by the user 805 and the iSlide-Add-in shows the menu tool bar 806. User may now begin dynamic interaction with the iSlide by pressing de dynamic icon in Textbox iSlide 807. System loads 808 and hides 809 text and forms and user may load and write as many text boxes as desired. User may deactivate dynamic mode at any time.

Figure 9:
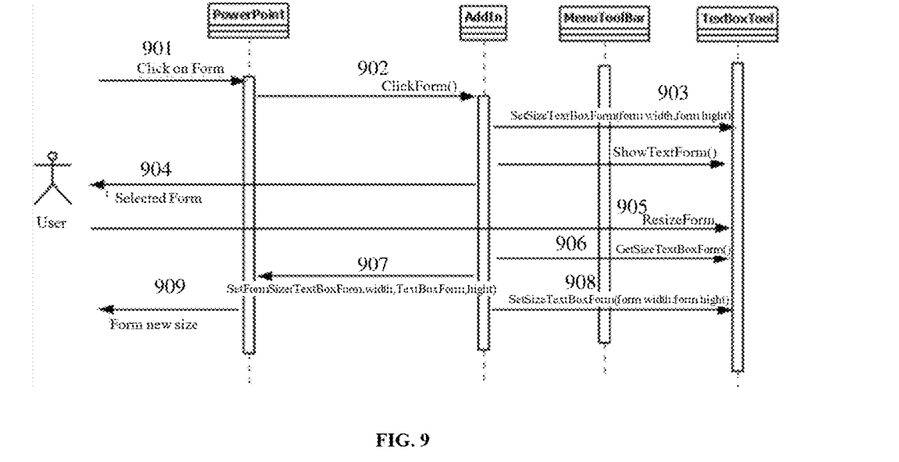
FIG. 9 is an UML sequence diagram to resize an object within the invention.

FIG. 9 is an UML sequence diagram that shows how to resize an object within the invention, the user selects with the mouse in a desktop, or by a touch in a mobile device, an iSlide form in PowerPoint (POWERPOINT) presentation mode 901, which generates a facsimile in the transition layer 902, 903 and it is visible for the user 904. The user clicks with the mouse one of the form extremes and drags it to its new position 905, 906. The communication layer keeps synchrony between transition and presentation mode layers 907. Once the drag is completed, the form is in its new position in both layers transition and presentation mode 908. As changes are visible in the presentation mode layer, they are visible to the user as well 909.

Figure 10:
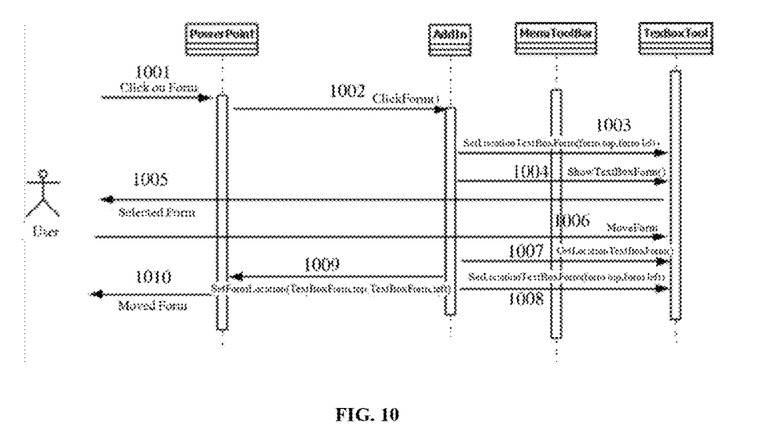
FIG. 10 is an UML sequence diagram to move an object with the invention.

FIG. 10 is an UML sequence diagram that shows how to move an object with the invention. The user selects with the mouse in a desktop, or by a touch in a mobile device, an iSlide form in PowerPoint (POWERPOINT) presentation mode 1001. The iSlide-Add-in identifies the selected form 1002; the transition layer reads the form location 1003 and generates a form copy in the transition layer (TextBoxTool) 1004. The selected form is visible for the user 1005. The user clicks and drags the form to move it 1006 and the transition layer reads the new position 1007 and update local position 1008. The transition layer requests presentation mode layer to update original form position 1009 and the user sees the moved form 1010.

Figure 11:
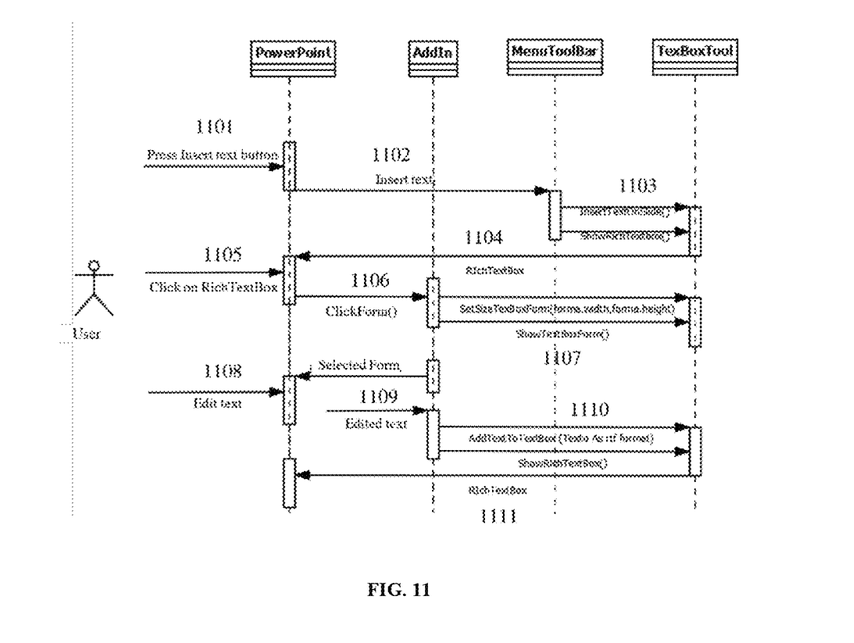
FIG. 11 is an UML sequence diagram to insert and delete text with the invention.

FIG. 11 is an UML sequence diagram that shows how to insert and delete text with the invention. The user selects Insert text button 1101, which is detected by the transition layer 1102 and the text field is added to the transition and presentation mode layers 1103. Edit mode is thus ready 1104 for the user to enter new text 1105, 1106. The user enters the edit mode 1108 into the selected form through the keyboard 1109. Data entered is captured by the transition mode 1110 layer and presentation mode layer 1111.

Figure 12:
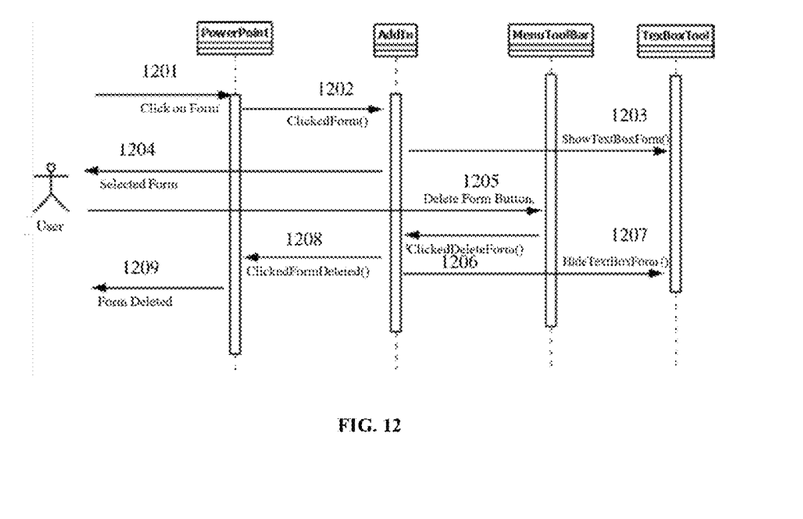
FIG. 12 is an UML sequence diagram to delete text with the invention.

FIG. 12 is an UML sequence diagram to delete text with the invention. The user selects the form to be deleted 1201, which is copied into the transition layer 1202, showed on the presentation mode layer 1203 and seen by the user 1204. The user clicks on the delete button from the tool bar menu 1205, which is read by the transition layer 1206, which hides the form 1207 and copies the information into the presentation mode layer 1208. The user sees the result 1209.

The ways the three iSlide-Add-in layers work (presentation, transition and communication layers) is by allowing the insertion of all type of forms in an iSlide. Combinations of forms generate specialized iSlides. Examples of specialized iSlides for business and engineering are: Porter 5 Forces, Balanced Scorecard, SWOT (Strengths, Weakness, Opportunities, and Threats), PEST (Political, Economic, Social, and Technological), Business Model CANVAS, Strategy Design & Implementation, Mind map, Business Excellence (EFQM), McKinsey 7s Framework, and Risk/Impact Matrix. Examples of specialized iSlides for education are: Brainstorming, Spider of Ideas, Comparisons, Domino Effect, Semantic Map, Definitions, Fishbone, Snapshot, Cause and effect, Pros and Cons, Differences and Similarities. Examples of other specialized iSlides are: Concept Mapping, Mind Mapping, and Outlining.

The Method

The iSlide method will work if PowerPoint (POWERPOINT) software presentation and iSlidesInstaller.exe 10, 20 are in the system hard disk 104, 204. Once iSlidesInstaller.exe is launched, an installation panel opens providing information regarding licensing agreement, installation folder and so forth. After installation PowerPoint (POWERPOINT) software presentation will show a new tab in its main ribbon: I-SLIDES, usually at the ribbon's right end 500.

In PowerPoint (POWERPOINT) design mode, the tab I-SLIDES allows the insertion of various iSlides: Whiteboard iSlide 501, Bullet iSlide 502, Matrix iSlide 503, Hierarchy iSlide 504, Text boxes iSlide 505; as well as access to numerous group commands: Business iSlides 506, Medical iSlides 507, More Specialized iSlides 508.

Figure 13:
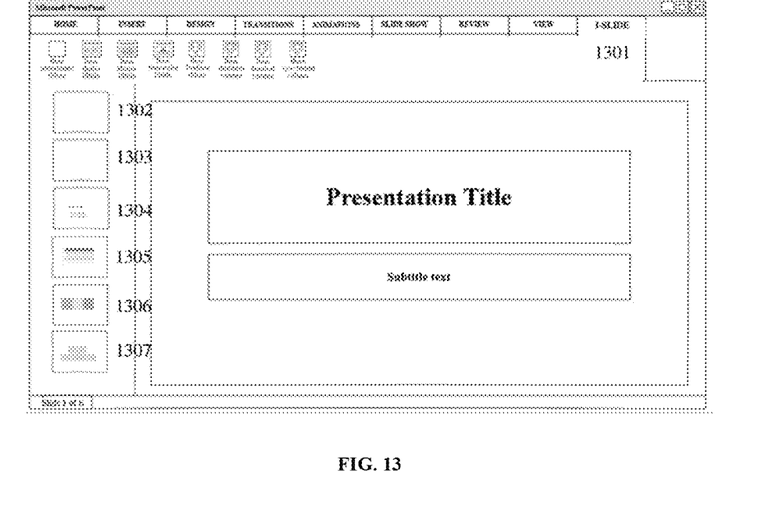
FIG. 13 shows a block diagram of PowerPoint design mode, where I-SLIDES commands are selected.

FIG. 13 shows a block diagram of PowerPoint (POWERPOINT) design mode, where the option I-SLIDES is selected 1301 and five iSlides have been inserted from the iSlides commands. The PowerPoint (POWERPOINT) software presentation slide sorter includes the default PowerPoint (POWERPOINT) title slide 1302, Whiteboard iSlide 1303 Bullet iSlide 1304, Matrix iSlide 1305, Text boxes iSlide 1306, Hierarchy iSlide 1307. In PowerPoint (POWERPOINT) design mode, iSlides work faithfully alike a PowerPoint (POWERPOINT) slide; thus, they may be edited during presentation design time.

iSlides performance is different to PowerPoint (POWERPOINT) slides in presentation mode. iSlides are dynamic. Dynamic iSlides, in design mode, text and objects are editable and positioned just as any other PowerPoint (POWERPOINT) slide. In presentation mode, PowerPoint (POWERPOINT) software presentation slides are neither editable nor mobile and iSlides-Add-in slides are either editable or mobile. Text and objects are editable and their position may be changed. An iSlide has a contextual menu, or tool bar, that allows changes in text and objects, in presentation mode. The tool bar activates from both the icon at the iSlide up left corner and the mouse left button. Possible actions in presentation mode are activate/deactivate dynamic mode and enter edit mode (insert, delete, change format settings).

Text editing is through keyboard either for insertion or deletion. Resizing objects is by selecting the object, holding one of the object's vertices with the mouse and drag to resize it. Changes in format setting are through the mouse right button or the menu tool bar at the screen top left corner.

Figure 14:
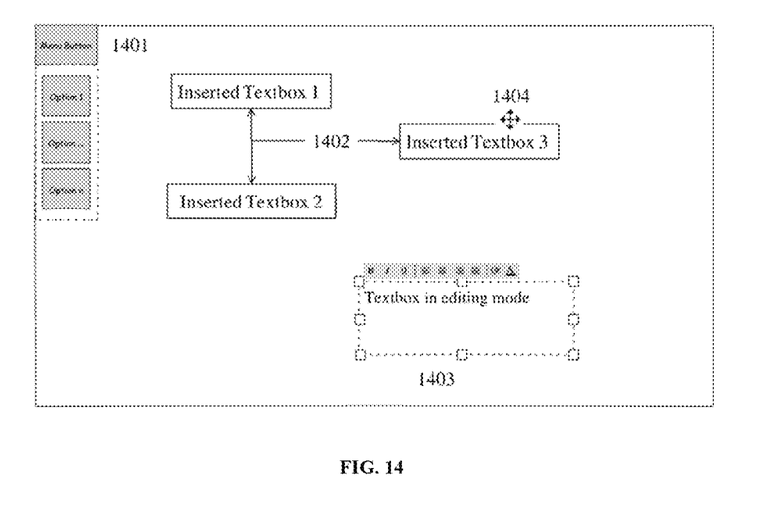
FIG. 14 shows a Whiteboard iSlide block diagram in a PowerPoint (POWERPOINT) presentation mode.

Specifically, FIG. 14 shows a Whiteboard iSlide block diagram in PowerPoint (POWERPOINT) presentation mode. It includes the tool bar menu at the top left corner 1401 with three options: activate/deactivate dynamic mode, insert textbox, and delete textbox. The diagram also shows four inserted textboxes, three present their contents 1402 and one is in edit mode 1403. One of the textboxes also shows the 'SizeAllCursor' indicating that the form is mobile 1404.

Figure 15:
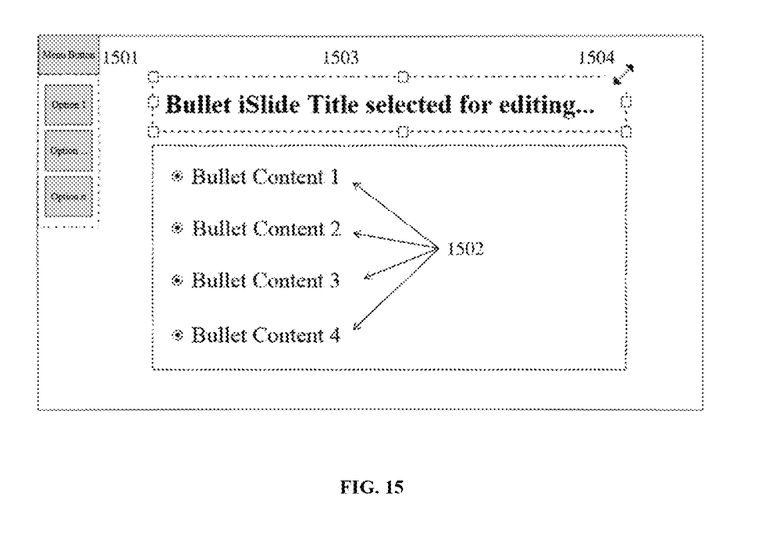
FIG. 15 shows a Bullet iSlide block diagram in a PowerPoint (POWERPOINT) (POWERPOINT)

FIG. 15 shows a Bullet iSlide block diagram in PowerPoint (POWERPOINT) presentation mode. It includes the tool bar menu at the top left corner 1501 with three options: activate/deactivate dynamic mode, insert bullet textbox, and delete bullet textbox. The diagram also shows four bulleted textboxes 1502, the iSlide title text box in editing mode 1503 and 'SizeDiagCursor' indicating that the form is resizable.

Figure 16:
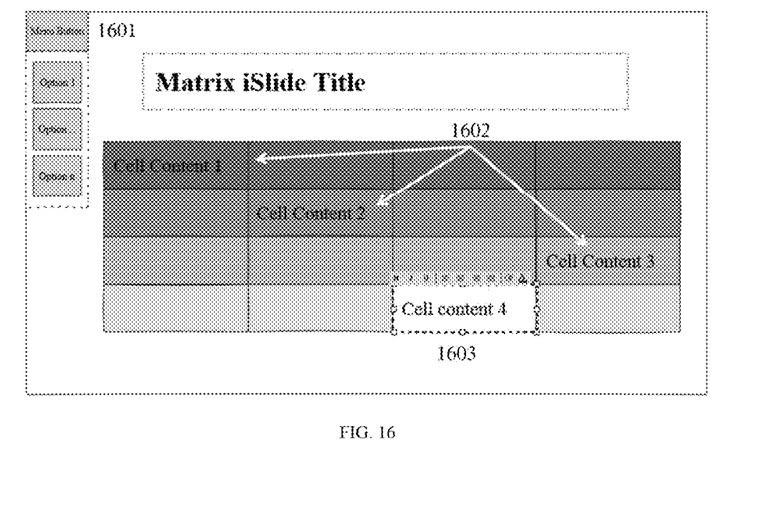
FIG. 16 shows a Matrix iSlide block diagram in a PowerPoint (POWERPOINT) presentation mode.

FIG. 16 shows a Matrix iSlide block diagram in PowerPoint (POWERPOINT) presentation mode. It includes the tool bar menu at the top left corner 1601 with three options: activate/deactivate dynamic mode, insert column or row, and delete column or row. The diagram also shows three cells with text entered 1602 and a fourth cell in edit mode 1603. Title box is also editable, mobile and resizable. Matrix is resizable too.

Figure 17:
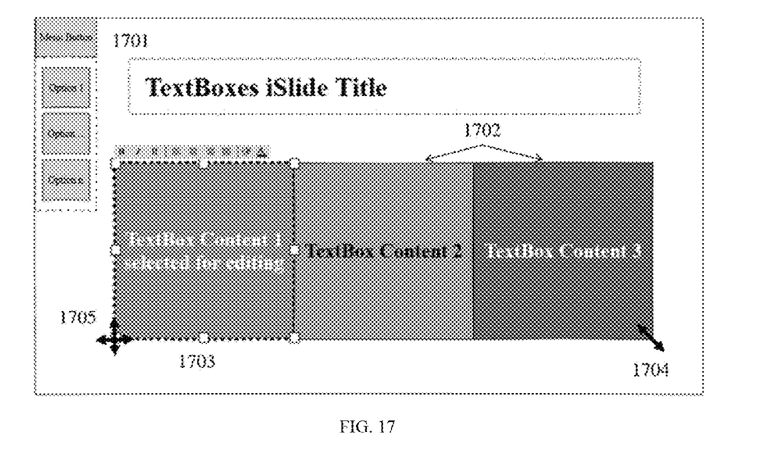
FIG. 17 shows a Textboxes iSlide block diagram in a PowerPoint (POWERPOINT) presentation mode.

FIG. 17 shows a Textboxes iSlide block diagram in PowerPoint (POWERPOINT) presentation mode. It includes the tool bar menu at the top left corner 1701 with three options: activate/deactivate dynamic mode, insert colored textbox, and delete colored textbox. The diagram also shows two colored textboxes with contents entered 1702 and one colored textbox in edit mode 1703. The diagram also shows the 'SizeDiagCursor' indicating that the colored textbox is resizable 1704 and the 'SizeAllCursor' indicating that the colored textboxes are mobile 1705.

Figure 18:
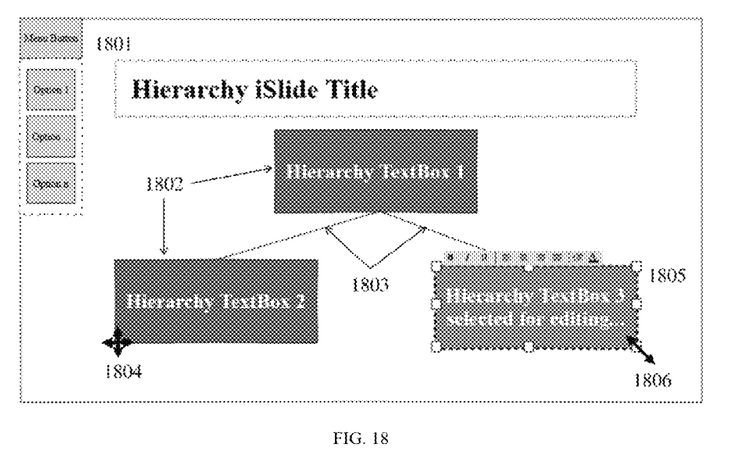
FIG. 18 shows a Hierarchy iSlide block diagram in a PowerPoint (POWERPOINT) presentation mode.

FIG. 18 shows a Hierarchy iSlide block diagram in PowerPoint (POWERPOINT) presentation mode. It includes the tool bar menu at the top left corner 1801 with a three options: activate/deactivate dynamic mode, insert linked colored textbox, and delete linked colored textbox. The diagram also shows three linked 1803 textboxes 1803, one of them is in editing mode 1805. The diagram also illustrates the 'SizeDiagCursor' indicating that the linked colored textbox is resizable 1806 and the 'SizeAllCursor' indicating that the linked colored textboxes are mobile 1804.

Figure 19:
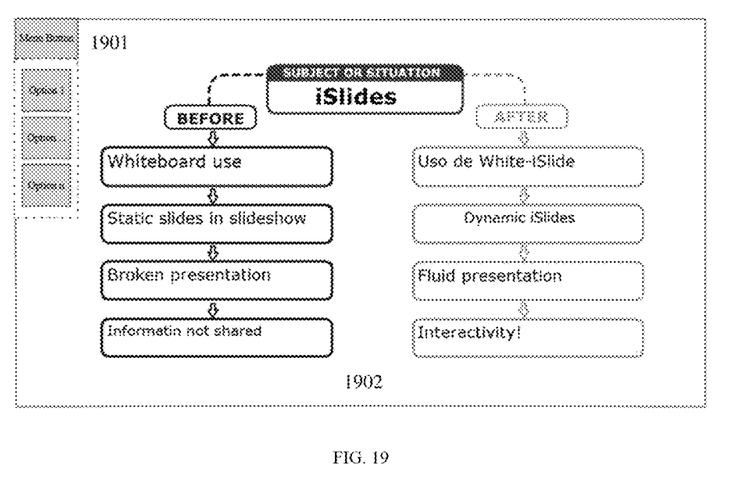
FIG. 19 is a specialized iSlide block diagram in a PowerPoint (POWERPOINT) presentation mode.

FIG. 19 is a specialized iSlide block diagram in PowerPoint (POWERPOINT) presentation mode. It includes the tool bar menu at the top left corner and 1901 and a combination of linked textboxes depicting a comparison 1902. Forms in this iSlide are combinations of forms in FIG. 14 to FIG. 18, hence editing, moving and resizing are inherited. Many other specialized iSlides are also available.

REFERENCES

Bartsch, R. &. (2003). Effectiveness of PowerPoint presentations in lectures. Computers & Education 41, 77-86.

Bligh, D. A. (1998). What's the Use of Lectures? Exeter, UK: Intellect Books.

Burke, L. A. (2009). Effectiveness of PowerPoint-Based Lectures across Different Business Disciplines: An Investigation and Implications. Journal of Education for Business, 84(4), 246-251.

Cisco Systems. (2014). Cisco ASA Serie Firewall CLI: Configurtion Guide. San Jose, Calif.: Cisco Systems.

Kosslyn, S. M. (2012). PowerPoint® Presentation Flaws and Failures: A Psychological Analysis. Frontiers in Psychology, 3, 230, doi:10.3389/fpsyg.2012.00230.

Prince, M. (2004). Does Active Learning Work? A Review of the Research. Journal of Engineering Education, 93(3), 223-231.

Savvoy, A. P. (2009). Information retention from PowerPoint™ and traditional lectures. Computers & Education 52, 858-867.

Schrad, M. (2010). In Defense of the Populist Lecture. Political Science and Politics, 759-765.

Silberman, M. (1995). Active Learning: 101 Strategies To Teach Any Subject. Des Moines, Iowa: Prentice-Hall.

Although embodiments of the invention have been shown and described, it is to be understood chat various modifications, substitutions, and rearrangements of parts, components, and/or process (method) steps, as well as other uses and design of the System and Method that Internally Converts PowerPoint (POWERPOINT) Non-Editable and Motionless Presentation Mode Slides Into Editable and Mobile Presentation Mode Slides (iSlides) can be made by those skilled in the art without departing from the novel spirit and scope of this invention.

What is claimed is:

1. A software application (iSlide-Add-in), to be run by a computer, which includes a set of instructions that when executed perform the steps of:
   install the iSlide-Add-in in the computer's hard disk;
   unpack the iSlide-Add-in into an installed version of PowerPoint (POWERPOINT) software presentation program in said computer;
   activate the iSlide-Add-in every time the PowerPoint software presentation program is opened;
   enhance the installed version of the PowerPoint software presentation program in said computer with a new functionality: interactivity in presentation mode;
   show a new I-SLIDE tab at the right of a main ribbon of the PowerPoint software presentation program;
   insert dynamic iSlides from the I-SLIDE tab;
   allow coexistence of iSlides and PowerPoint slides;
   edit, resize and move iSlides' texts and objects in PowerPoint design mode;
   activate dynamic mode allowing editing, resizing and moving iSlides' texts and objects in PowerPoint presentation mode or slide-show; and
   do nothing if the slide in presentation mode is a conventional PowerPoint slide.

2. The software application of claim 1, wherein edit, resize and move iSlides' texts and objects in PowerPoint presentation mode or slide-show includes:
   adding new plain lines of text, new bulleted lines of text, new text boxes, new text in cells and new text in linked/related boxes;
   editing plain lines of text, bulleted lines of text, text boxes, text in cells and text in linked/related boxes;
   change font characteristics, that is, type, size and color;
   resize text container boxes, either with or without border;
   relocate text container boxes, either with or without border;
   align text at left, center, right or justified within its container textbox form; and
   wherein non-text objects, such as images, graphs, drawings, and others may be resized and relocated.

3. The software application of claim 1, wherein Insert dynamic iSlides from the PowerPoint I-SLIDE tab includes the insertion of a variety of iSlides: Whiteboard, Bulleted, Textboxes, Matrix, Hierarchy, and Specialized iSlides, wherein:
   Whiteboard iSlide is a presentation mode PowerPoint interactive slide that substitutes the use of a whiteboard or paperboard, such iSlide is a blank iSlide that inserts bulleted text, which is editable, resized and mobile in presentation mode;
   Bulleted iSlide is a presentation mode PowerPoint iSlide that inserts one or two columns of bulleted texts, wherein all bulleted texts are editable, resized and mobile in presentation mode;
   Textboxes iSlide is a presentation mode PowerPoint iSlide that contains text boxes that can be edited, resized and repositioned;
   Matrix iSlide is a presentation mode PowerPoint iSlide that generates crosstabs, wherein columns and rows are added activating the editing mode and texts are editable and columns and rows mobile in presentation mode;
   Hierarchy iSlide is a presentation mode PowerPoint iSlide that contains related text boxes, which are editable, resized, repositioned and relationships redefined; and
   Specialized iSlides is a Presentation mode PowerPoint interactive specialized iSlides that combine forms in the previous iSlides generating many well-known technical diagrams.

4. The software application of claim 3, wherein the Whiteboard iSlide is a blank interactive slide that in PowerPoint presentation mode inserts empty text lines that receive text, which may freely be located on the screen, where in the inserting operation may be repeated as many times as commanded, wherein text lines may be edited and deleted, the text lines basic format elements may also be changed, such as font type, font size, font color and the text in text form may be aligned at left, center, right or justified.

5. The software application of claim 3, wherein the Bulleted iSlide is a blank interactive slide that in PowerPoint presentation mode inserts empty bulleted text lines that accept text, wherein the user enters the bulleted text and may be freely located on the screen; wherein the Bulleted text line insertion may be repeated as many times as instructed; Locating bulleted text lines may accommodated in one or two columns; Bulleted text lines may be edited and deleted; Bulleted text lines basic format elements may also be changed, such as font type, font size, and font color; Bulleted text lines may be aligned at left, center, right or justified.

6. The software application of claim 3, wherein the Textboxes iSlide is an interactive slide that in PowerPoint presentation inserts empty textboxes, by default the Textboxes iSlide come with three empty textboxes, wherein the text is entered into the boxes and they may be freely located on the screen; more textboxes may be inserted and freely located on the screen; wherein this operation may be repeated as many times as desired; and the Text in boxes may be edited and deleted; wherein the text in boxes basic format elements may also be changed, such as font type, font size, and font color and text aligned at left, center, right or justified; the text in boxes may be inserted and deleted and may be change such as size and position and may also be changed such as background color.

7. The software application of claim 3, wherein the matrix iSlide is a dynamic iSlide that inserts a doubly entry table, by default the Matrix iSlide comes with five empty columns and five empty rows and by default cells in the Matrix iSlide come with the typically PowerPoint light blue color; wherein the text is entered into the cells; more columns and rows may be inserted; rows and columns may change position; the text in cells may be edited and deleted; the text in cells basic format elements may also be changed, such as font type, font size, and font color; the cells basic format elements may also be changed such as background color; and the text in cells may be aligned at left, center, right or justified.

8. The software application of claim 3, wherein the Hierarchy iSlide is an interactive slide that in PowerPoint presentation mode inserts linked/related textboxes, such as in an organigram, by default the Hierarchy iSlide comes with three linked empty colored boxes, one above the other two and with two pre-drawn lines from the above box to the bellow boxes; wherein by default textboxes in the Hierarchy iSlide come with three different colors; the text is entered into the textboxes; more colored empty textboxes and linking lines may be inserted; Colored textboxes and linking lines may change position; the text in textboxes may be edited and deleted; the text in textboxes basic format elements may also be changed, such as font type, font size, and font color; the textbox basic format elements may also be changed such as background color; the textboxes may be resized and relocated; the text in textboxes may be aligned at left, center, right or justified.

9. The software application of claim 3, wherein the Specialized iSlides are made up by: combining, editing, resizing and relocating forms and connectors; combinations of forms and connectors reproduce diagrams frequently used in several professional areas, such as business, engineering, educational, medical and the like; such as those used in business and engineering: Porter 5 Forces, Balanced Scorecard, SWOT (Strengths, Weakness, Opportunities, and Threats), PEST (Political, Economic, Social, and Technological), Business Model CANVAS, Strategy Design & Implementation, Mind map, Business Excellence (EFQM), McKinsey 7s Framework, and Risk/Impact Matrix; Such as specialized iSlides used in education: Brainstorming, Spider of Ideas, Comparisons, Domino Effect, Semantic Map, Definitions, Fishbone, Snapshot, Cause and effect, Pros and Cons, Differences and Similarities; Such as other specialized iSlides: Concept Mapping, Mind Mapping, and Outlining.

10. The software application of claim 1, further include saving a presentation that contains iSlides, including changes occurred in presentation mode, is through PowerPoint saving commands; FILE/Save, or FILE/Save As, or Control and S keys simultaneously.

11. The software application (iSlide Add-in) of claim 1, is a native software to PowerPoint since its components and class functionalities structure are programmed and compiled through .NET Framework, comprising:

one type of iSlide-Add-in component is the Add-in as such, since it has methods that allow editing attributes of elements present in a presentation;

second types of components are libraries that extend iSlide-Add-in functionalities, are structured as data definition language (DDL) files and are made up of a set of classes;

a first iSlide-Add-in component class is an 'Array Functions' that manages arrays changes from dynamic to static stages;

a second iSlide-Add-in component class is a PointFunctions' that organizes and generates methods to manage elements position on the iSlide as well as mouse clicked forms selection;

a third iSlide-Add-in component class is 'ScreenFunctions' that reads output device resolution to adjust iSlides presentation mode;

a fourth iSlide-Add-in component class is 'Slide Function' that manages forms in an iSlide, iSlides themselves and iSlides presentation mode;

a fifth iSlide-Add-in component class is 'TableFunctions' that implements functions to work with matrix structures in presentation mode;

a first library component class is 'Toolbar' that manages the functionalities available in the toolbar at the iSlide top corner and includes activate/deactivate edit mode, insert and delete form elements;

a second library component class is 'ContexMenu' that implements a contextual menu, which is activated with the mouse right button; the menu opens wherever it is the mouse cursor;

a third library component class 'Text-BoxLayer' that creates a copy of a selected form, the copied form may be edited, moved, deleted and the result reflected into presentation mode; and a fourth library component class is 'InsertHierarchyToSlide' that manages rectangular and connector forms; connectors are linked to rectangular forms; and where Message layers passing are performed by the 'ToolBarLib' library 'Toolbar Extra' class, including 'listeners', 'containers' and 'notifications' for the messages.

12. The software application of claim 1, comprising:

programmed and compiled in .NET Framework, the iSlide-Add-in gets away from security risks and assures iSlides running time performance equal to conventional PowerPoint slides;

new PowerPoint interactivity provides a platform for active-presenter and active-audience approach to conference delivery; and audiences in business meetings, conference presentations, educational lectures, among many other situations in which PowerPoint is used, now do have options of submitting comments or feedback and the presenter may capture them in any of the iSlides.

13. A system to run the software application (iSlide-Add-in) of claim 1, comprising a computer desk top, notebook or netbook with operating system Windows 7 or later versions or iOS operation system installed or tablet or mobile device with operating system Windows 8 or iOS 8 installed.

14. The system of claim 13, wherein the computer has an installed Microsoft PowerPoint 2013 software presentation program or Microsoft 365 Office suite software presentation program.

* * * * *